Patented Nov. 30, 1948

2,455,301

UNITED STATES PATENT OFFICE

2,455,301

PLASTICIZERS FOR POLYVINYL ACETAL RESINS

Harry R. Gamrath, St. Louis, Mo., assignor to Monsanto Chemical Company, St. Louis, Mo., a corporation of Delaware No Drawing. Application May 8, 1946, Serial No. 668,324

10 Claims. (Cl. 260—31.8)

The present invention relates to polyvinyl acetal resins and particularly to plastic compositions embodying such resins and plasticizers consisting of esters typified by butyl succinyl butyl glycolate. The invention also relates to laminated or safety glass and films of such plastic compositions which are suitable interlayers for safety glass.

The principal object of the present invention is to provide a plastic composition embodying a polyvinyl acetal resin which, besides possessing the desirable properties of the polyvinyl acetal resin as a safety glass interlayer, is characterized by increased flexibility, particularly at low temperatures, excellent adhesion to glass, and great stability. Other objects and advantages of the invention, some of which are referred to hereinafter, will be apparent to those skilled in the art to which this invention pertains.

The present appliaction is a continuation-in-part of my co-pending application Serial Number 395,733, filed May 29, 1941, now abandoned.

I have discovered that polyvinyl acetal resins are unexpectedly improved in various charasteristics, especially those desired in interlayer films for safety glass manufacture, by incorporating or embodying in plastic compositions comprising such resins a plasticizer of the type of butyl succinyl butyl glycolate. Films of plastic compositions containing such plasticizers are characterized by great rubberiness or "nerve," by excellent adhesion to glass, and by great flexibility at low temperatures.

Heretofore, a great number of plasticizers have been used with polyvinyl acetal resins but relatively few of these have been found which impart to polyvinyl acetal resins a high degree of flexibility at low temperatures. Of the common plasticizers for nitrocellulose and cellulose acetate, few have produced films of satisfactory flexibility. Those plasticizers which are known to produce great flexibility in polyvinyl acetal resins are ethylene glycol dioctoate, triethylene glycol dihexoate and alkyl esters of diglycolic and thiodiglycolic acids. The latter are disclosed in Patent No. 2,205,420, granted to Lucas P. Kyrides. The plasticizers specified in the present invention, represented by butyl succinyl butyl glycolate, are known compounds. These compounds and methods for their preparation are disclosed in Patents Nos. 2,073,937, 2,073,938, 2,120,755 and 2,120,756 granted to Lucas P. Kyrides. Compounds such as di-2-ethylhexyl thiodiglycolate and dibutyl diglycolate are excellent plasticizers for polyvinyl acetal resins, but polyvinyl acetal resin films embodying butyl phthalyl butyl glycolate and similar compounds, on the other hand, are deficient in flexibility at low temperatures. Contrary to expectations, it was found that when butyl succinyl butyl glycolate and similar compounds were used as plasticizers for such films, the flexibility was greater than heretofore observed with any similar compounds.

The compounds whose use is contemplated in the present invention conform to the general formula:

X—OOC—R—COO—CH₂—COO—X in which R is an alkylene radical having from 2 to 4 carbon atoms and X is an alkyl radical having from 1 to 8 carbon atoms. Thus, the invention refers to the use of alkyl succinyl alkyl glycolates, alkyl glutaryl alkyl glycolates and alkyl adipyl alkyl glycolates in which the alkyl groups may be methyl, ethyl, propyl, butyl, amyl (pentyl), hexyl, heptyl or octyl radicals. The preferred species are those compounds in which R is a radical selected from the group consisting of dimethylene (—CH₂CH₂—), trimethylene (—CH₂CH₂CH₂—) and tetramethylene (—CH₂CH₂CH₂CH₂—) radicals.

Preferred compounds for use according to the invention are butyl succinyl ethyl glycolate, butyl succinyl butyl glycolate, hexyl succinyl hexyl glycolate, 2-ethylbutyl succinyl 2-ethylbutyl glycolate, butyl succinyl n-octyl glycolate, butyl glutaryl butyl glycolate and butyl adipyl butyl glycolate. The higher alkyl derivatives are preferred to the lower alkyl derivatives because of their greater insolubility in water and their greater non-volatility.

The plasticizers specified herein are especially effective when used with polyvinyl butyraldehyde resins, that is, resins such as are obtained by the condensation of a partially hydrolyzed polyvinyl ester with butyraldehyde, although they are of value with polyvinyl acetal resins in general. The preparation of such polyvinyl acetal resins is disclosed in various patents, for example, in Morrison, Skirrow and Blaikie, U. S. Patent No. 2,036,092, Kuhn and Hopff, U. S. Patent No. 2,044,730 and in French Patent No. 793,175.

The proportion of the plasticizer which is embodied in the polyvinyl acetal resin is variable. To produce rubbery sheets suitable for use as interlayers for safety glass, approximately 30 parts by weight of plasticizer are necessary, and I prefer to use about 50 parts by weight to each 100 parts of the resins and generally less than 100 parts by weight to each 100 parts by weight of resin, for example, 80 parts of plasticizer. The preferred range of plasticizer, in which the outstanding low temperature flexibility characteristics of the plastic compositions of the present invention are best exemplified, is that of 30 to 80 parts by weight of the plasticizer to each 100 parts by weight of resin. Proportions greatly in excess of 100 parts by weight of resin begin to show an absence of rubberiness or "nerve." The proportion of plasticizer will be dependent to a great extent on the characteristics of the plasticizer itself and the extent of its compatibility with the resin.

The plasticizer is compounded or incorporated with the resin in conventional manner. Thus, it may be incorporated by simple kneading in a mixer, either while cold or preferably with the aid of heat. Mutual solvents may be used to facilitate the incorporation although this is a less preferable method since solvent must be expelled from the final composition. After the incorporation of the plasticizer and other ingredients, which may include stabilizers, plasticizers, coloring agents and the like, the composition may be cast into forms or sheets in conventional manner.

Other plasticizers which may be used in admixture with the alkyl succinyl alkyl glycolates or their equivalents as set forth herein are dibutyl phthalate and other alkyl phthalates, tributyl phosphate and other alkyl phosphates, arylsulfonamides, alkyl diglycolates, alkyl thiodiglycolates and alkyl phthalyl alkyl glycolates.

Examples of the methods of preparing the plasticizing compounds of my invention and typical plastic compositions embodying polyvinyl acetal resins and the compounds are disclosed hereinafter.

PREPARATION OF BUTYL SUCCINYL BUTYL GLYCOLATE

Into a flask provided with a stirrer, thermometer, fractionating column, water-separator tube and a return line from the water-separator tube to the flask, are added 222 grams of butanol (3 mols) and 100 grams of succinic anhydride (1 mol) and the mixture is heated gently until solution results. The mixture is thereafter heated gently for about one hour at refluxing temperature (128° to 130° C.). After cooling to about 80° C., 69.8 grams (½ mol) anhydrous potassium carbonate (99%) is added in small portions during the course of about 15 minutes and the mixture is again heated under gentle reflux for another 30 minutes. Water is thereafter removed by distillation, making use of a water-separator tube for this purpose. To the mixture is then added slowly, over a period of about 20 minutes, 150.5 grams (1 mol) of butyl chloroacetate, the temperature at the end of the addition being allowed to rise to about 122° C. and the mixture is refluxed for 10 hours. The greater portion of the excess butanol is then removed by distillation under vacuum at a pressure of about 60 mm. of mercury, and, after cooling the residue, 300 cc. of water is added to dissolve the salts. The water is separated from the oily product and the oily product is further washed several times with dilute sodium carbonate solution at a temperature of about 50° to 60° C. The oily ester is then washed three times with dilute sodium chloride solution and steam distilled until about 1 liter of aqueous distillate is obtained. The residue is further washed with sodium carbonate solution and sodium chloride solution and then dried, and decolorized by heating for 6 hours at 85° to 90° C. with charcoal. The boiling point of the butyl succinyl butyl glycolate is approximately 305° C. at a pressure of 755 mm. of mercury. It has a refractive index of about 1.4340 at 25° C. and a specific gravity of about 1.0313 at 25°/25° C.

The product may also be decolorized by treatment with dilute aqueous potassium permanganate solution followed by sodium metabisulfite ($Na_2S_2O_5$).

PREPARATION OF BUTYL SUCCINYL ETHYL GLYCOLATE

By substituting ethyl chloroacetate in the foregoing preparation for the butyl chloroacetate in an equivalent amount, butyl succinyl ethyl glycolate is obtained. The product is similar in characteristics to the butyl succinyl butyl glycolate.

PREPARATION OF ETHYL SUCCINYL ETHYL GLYCOLATE

By substituting anhydrous ethyl alcohol for butanol and ethyl chloroacetate for butyl chloroacetate in equivalent amounts in the hereinabove described preparation of butyl succinyl butyl glycolate, the product is ethyl succinyl ethyl glycolate.

In a similar manner, by starting with glutaric anhydride or adipic anhydride the corresponding alkyl glutaryl alkyl glycolates and alkyl adipyl alkyl glycolates can be prepared.

EXAMPLE 1

Forty (40) parts by weight of butyl succinyl ethyl glycolate and 100 parts by weight of a polyvinyl butyraldehyde acetal resin resulting from the condensation of butyraldehyde with a partially hydrolyzed vinyl ester polymer are kneaded together with the aid of heat until a homogeneous composition is produced. The mass is then pressed into the form of sheets having a thickness of approximately 0.020 inch.

The resulting sheets are clear, very flexible and very rubbery and elastic.

EXAMPLE 2

Forty (40) parts by weight of butyl succinyl butyl glycolate and 100 parts by weight of a polyvinyl butyraldehyde acetal resin resulting from the condensation of butyraldehyde with a partially hydrolyzed vinyl ester polymer are kneaded together and pressed into sheets as in Example 1. The sheets are clear and possess excellent elasticity and rubberiness.

EXAMPLE 3

Fifty (50) parts by weight of butyl succinyl butyl glycolate and 100 parts by weight of a polyvinyl butyraldehyde acetal resin resulting from the condensation of butyraldehyde with a partially hydrolyzed vinyl ester polymer are kneaded together and pressed into films having a thickness of about 0.020 inch as in Example 1.

Films were prepared as described in the foregoing examples and others were prepared in a similar manner with other plasticizers. The flexibilities of these films were determined by cooling the film having a thickness of about 0.020 inch to a temperature of −20° F. (−29° C.) and while maintaining it at such temperature, subjecting it to continual bending across one fold of the film until it broke. The number of bends, each bend consisting of a complete fold through an angle of 180° and back to the original position, which were required to break the respective films are shown in the tables which follow, under the heading "Bends at −20° F." In the table the composition of the films is represented under the heading "Plasticizer per 100 parts resin, wherein the resin employed in each instance was a polyvinyl butyraldehyde acetal resin resulting from the condensation of butyraldehyde with a partially hydrolyzed vinyl ester polymer.

| No. | Plasticizer per 100 parts resin | Bends at −20° F. |
|---|---|---|
| 1. | 50 parts dibutyl phthalate | 220 |
| 2. | 50 parts triacetin (glyceryl triacetate) | 250 |
| 3. | 50 parts tripropionin (glyceryl tripropionate) | 250 |
| 4. | 50 parts di-n-octyl succinate | 820 |
| 5. | 50 parts dibutyl sebacate | 780 |
| 6. | 50 parts triethylene glycol dihexoate | 835 |
| 7. | 50 parts butyl phthalyl butyl glycolate | 45 |
| 8. | 80 parts butyl phthalyl butyl glycolate | 996 |
| 9. | 50 parts butyl succinyl butyl glycolate | 3500 |
| 10. | 60 parts dibutyl diglycolate | 80–135 |
| 11. | 50 parts dibutyl thiodiglycolate | 320 |
| 12. | 50 parts dicyclohexyl thiodiglycolate | 58 |
| 13. | 50 parts di-2-ethylhexyl thiodiglycolate | 776 |
| 14. | 80 parts butyl maleyl butyl glycolate | 2600 |

It will be seen by a comparison of the various compositions in the table, which includes compositions comprising representative plasticizers recognized as satisfactory for use with polyvinyl acetal resins, that the flexibility of sheets produced with butyl succinyl butyl glycolate (No. 9) is unexpectedly high and considerably higher than that produced by the use of butyl phthalyl butyl glycolate or other esters of diglycolic and thiodiglycolic acids.

Sheets of plastic compositions of the present invention may also be tested on a torsion apparatus such as that described by Clash and Berg on pages 56 to 59 of "Symposium on Plastics," February 1944, published by the American Society for Testing Materials. In this text, the low temperature flexibility is measured in terms of the flex temperature ($T_F$) which is defined as the temperature at which a specimen 0.040 inch thick, ¼ inch wide and 1½ inches long is twisted through 200° of arc within 5 seconds of time under an applied torque of $5.68 \times 10^5$ dyne centimeters (approximately 130,000 pounds per square inch). The flex temperature corresponds in effect to the second order transition point of the plasticized composition, i. e., that temperature at which the material changes from a relatively rigid to a relatively flexible material. The $T_F$ values for the compositions of the present invention are substantially lower than the corresponding $T_F$ values for the reference compositions listed in the afore-described table.

Films produced with polyvinyl acetal resins and the plasticizers specified herein are clear, transparent and very flexible, especially in comparison with other plasticizers at low temperatures and when produced by the use of the specified proportions of plasticizer are rubbery and elastic and are especially suitable for use on safety glass interlayers.

Sheets prepared according to this invention can be used as interlayers in safety glass, the incorporation being effected with or without the use of adhesives. A preferred method of producing a sheet of safety glass consists in assembling the sheets of glass and interlayers and then pressing them gently to expel air between the sheets. They are then laminated under heat and pressure by means of diaphragm press to which heat is applied. The pressing is finally completed by the hydraulic method, the resulting sheet being placed in an autoclave and exposed to a pressure of about 10 atmospheres and to a temperature from 100° to 150° C.

Safety glass sheets in which films of the plastic composition of the present invention are incorporated show improved resistance in impact or shattering tests at low temperatures. In conducting such tests, metal balls of various weights and sheets of the glass, 12 inches square, are used. The height from which a ball of a definite standard weight can be dropped without shattering the glass, which is maintained at a standard temperature, is determined. A sheet made with nitrocellulose at −10° F. (−23° C.) barely withstands the impact of a 0.5 pound ball dropped from a height of 3 feet whereas a glass made according to the invention withstands the impact of the same ball dropped from heights of 30 feet or more. A sheet of glass made with an interlayer of a polyvinyl butyraldehyde acetal resin resulting from the condensation of butyraldehyde with a partially hydrolyzed vinyl ester polymer prepared according to the procedure described in Example 1 withstands an impact of a 2-pound ball dropped from heights of over 15 feet at this temperature.

Inasmuch as the foregoing description comprises preferred embodiments of the invention it is to be understood that the invention is not restricted thereto and that changes and modifications may be made therein without departing substantially from the invention, which is defined in the appended claims.

I claim:

1. A plastic composition comprising a polyvinyl acetal resin and, as a modifying agent therefor, from 30 to 80 parts per 100 parts of the polyvinyl acetal resin, of an ester of the general formula:

$$X-OOC-R-COO-CH_2-COO-X$$

in which R is an alkylene radical having from 2 to 4 carbon atoms and X is an alkyl radical having from 1 to 8 carbon atoms.

2. A plastic composition comprising a polyvinyl butyraldehyde acetal resin and, as a modifying agent therefor, from 30 to 80 parts per 100 parts of the polyvinyl acetal resin, of an ester of the general formula:

$$X-OOC-R-COO-CH_2-COO-X$$

in which R is an alkylene radical having from 2 to 4 carbon atoms and is X an alkyl radical having from 1 to 8 carbon atoms.

3. A plastic composition comprising a polyvinyl acetal resin and, as a modifying agent therefor, from 30 to 80 parts per 100 parts of the polyvinyl acetal resin, of butyl succinyl butyl glycolate.

4. A plastic composition comprising a polyvinyl acetal resin and, as a modifying agent therefor, from 30 to 80 parts per 100 parts of the polyvinyl acetal resin, of butyl succinyl ethyl glycolate.

5. A plastic composition comprising a polyvinyl acetal resin and, as a modifying agent therefor, from 30 to 80 parts per 100 parts of the polyvinyl acetal resin, of ethyl succinyl ethyl glycolate.

6. A plastic composition comprising a polyvinyl butyraldehyde acetal resin and, as a modifying agent therefor, from 30 to 80 parts per 100 parts of the polyvinyl acetal resin, of butyl succinyl butyl glycolate.

7. A plastic composition comprising a polyvinyl butyraldehyde acetal resin and, as a modifying agent therefor, from 30 to 80 parts per 100 parts of the poylvinyl acetal resin, of butyl succinyl ethyl glycolate.

8. A plastic composition comprising a polyvinyl butyraldehyde acetal resin and, as a modifying agent therefor, from 30 to 80 parts per 100 parts of the polyvinyl acetal resin, of ethyl succinyl ethyl glycolate.

9. A plastic interlayer film for safety glass formed of a plastic composition as defined in claim 1.

10. A plastic interlayer film for safety glass formed of a plastic composition as defined in claim 3.

HARRY R. GAMRATH.

REFERENCES CITED

The following references are of record in the file of this patent:

UNITED STATES PATENTS

| Number | Name | Date |
|---|---|---|
| 2,021,121 | Dykstra | Nov. 12, 1935 |
| 2,184,426 | Kocker | Dec. 26, 1939 |
| 2,227,154 | Russell | Dec. 31, 1940 |